Jan. 28, 1930.  O. MAGNUSSON  1,744,909
LOGGING TOOL
Filed Sept. 26, 1927
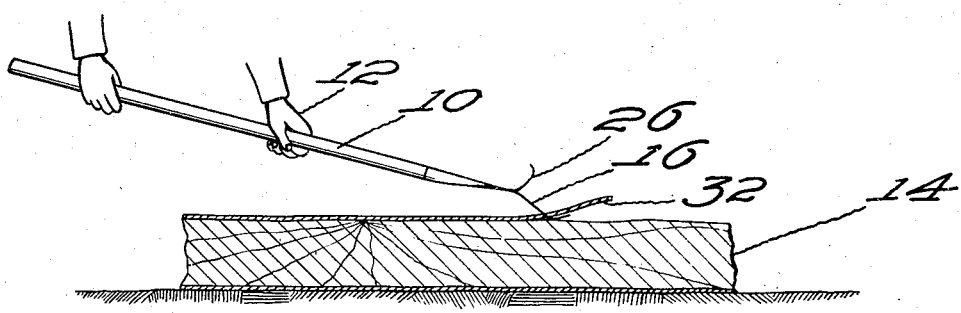
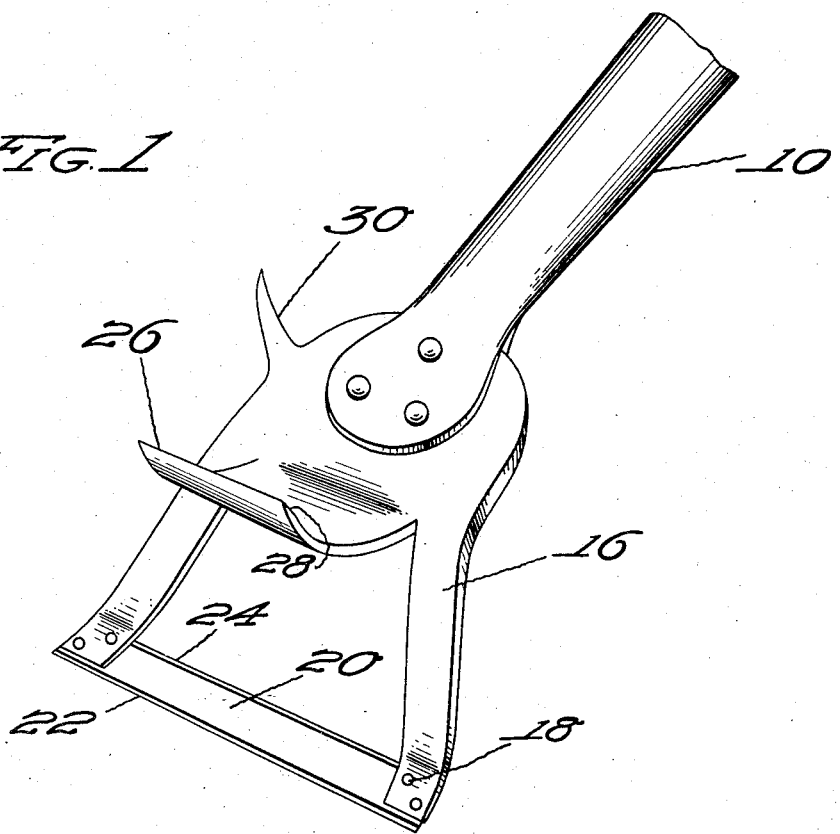
Oscar Magnusson
INVENTOR Patented Jan. 28, 1930

1,744,909

UNITED STATES PATENT OFFICE

OSCAR MAGNUSSON, OF LIVINGSTON, MONTANA

LOGGING TOOL

Application filed September 26, 1927. Serial No. 222,029.

This invention relates to improvements in logging tools, and has for one of its principal objects the provision of a tool to be used by lumber men and the like for certain finishing operations in preparing timber for the market.

One of the important objects of this invention is to provide, in a logging tool, the combination of certain essential elements which are either ordinarily used by lumbermen, or which would be very acceptable to same in the pursuit of their trade.

Another and further important object of this invention is to provide, in a single handy, readily available and easily operated tool, the advantages of a number of tools or utensils which are necessary to lumbermen, loggers, and the like.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved tool of this invention, showing it in actual use on a log.

Figure 2 is a perspective view of the tool.

As shown in the drawings:

The reference numeral 10 indicates generally a handle, preferably formed of tough wood or steel, which is adapted to be grasped by the hands 12 of the operator and used in trimming or finishing a log or the like 14.

Attached to the handle 10 is a forked member 16, the ends of the forks having attached thereto by means of screws, bolts, or rivets 18 a blade 20 which is sharpened at each edge, as shown at 22 and 24.

Preferably integral with the fork 16 is an outwardly turned blade 26 positioned between the tines of the fork, and also having a cutting edge 28 thereon, the edge being turned backwardly and inwardly as best shown in Figure 2.

Further applied to the fork member 16, and either integral therewith or attached thereto in some convenient manner is a hook or gouge 30 in the form of a sharpened lug, as best shown in Figure 2, which is turned slightly rearwardly towards the handle 10 and is provided with a fairly sharp point, although tapering down from a rather blunt and preferably circular base.

As shown in Figure 1, the blade 20 may be used to strip bark or the like 32 from the log 14, and may be used either by drawing the tool rearwardly, or by pushing forwardly, in an obvious manner.

The curved blade 26 is preferably used to gouge out bark from channels or grooves which may be in the log, or to gouge out undesirable accumulations of débris which might have been deposited in scars or furrows in the log.

The member 30 is used to turn the log and also to gouge out deposits of foreign material, rotten wood or the like which usually occur in knotholes or similar rather circular indentations in timber.

It will be evident that herein is provided a very handy tool for lumbermen or the like, which combines the advantages of many tools in a single implement, and which can be used with great facility and with considerable precision in preparing logs, timber, or the like for the market or for further dressing in a saw mill.

I am aware that many changes may be made and numerous details of construction varied throughout a wide range without departing from the principles of this invention, and I therefore do not purpose limiting the patent granted hereon otherwise than as necessitated by the prior art.

I claim as my invention:

A logging tool comprising in a single implement a combined cutting and drawing blade, having two edges, a bifurcated support for the blade, said support riveted to the edges of the blade and bent upwardly to allow use of the drawing edge, a furrow notching blade integral with the bifurcated support and bent outwardly between the legs thereof in a direction opposite to the bending of the said legs, a knothole gouging implement also integral with the bifurcated support and comprising a pointed extension in the same plane as the body thereof, and directed outwardly at approximately a right angle to the legs, and an operating handle attached to the body of said bifurcated blade support.

In testimony whereof I affix my signature.

OSCAR MAGNUSSON.